(12) United States Patent
Aihara et al.

(10) Patent No.: US 9,726,290 B2
(45) Date of Patent: Aug. 8, 2017

(54) SEAL STRUCTURE USING METAL GASKET

(75) Inventors: Kazuya Aihara, Makinohara (JP);
Shinya Nakaoka, Makinohara (JP);
Masaru Ito, Makinohara (JP); Isao Tanji, Makinohara (JP); Takanori Anzai, Makinohara (JP); Shota Toma, Fujisawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/131,281

(22) PCT Filed: Apr. 24, 2012

(86) PCT No.: PCT/JP2012/060921
§ 371 (c)(1),
(2), (4) Date: Apr. 1, 2015

(87) PCT Pub. No.: WO2013/008511
PCT Pub. Date: Jan. 17, 2013

(65) Prior Publication Data
US 2015/0211637 A1    Jul. 30, 2015

(30) Foreign Application Priority Data

Jul. 11, 2011 (JP) .................................. 2011-152543
Dec. 27, 2011 (JP) .................................. 2011-285551

(51) Int. Cl.
*F16J 15/08* (2006.01)
*F16J 15/12* (2006.01)

(52) U.S. Cl.
CPC ....... *F16J 15/0887* (2013.01); *F16J 15/0806* (2013.01); *F16J 15/0818* (2013.01);
(Continued)

(58) Field of Classification Search
CPC .......... F16J 15/08; F16J 15/122; F16J 15/104; F16J 15/0818; F16J 15/0825;
(Continued)

(56) References Cited

U.S. PATENT DOCUMENTS 3,909,019 A * 9/1975 Leko ..................... F16J 15/0825
                                                277/649
4,915,398 A * 4/1990 Kitagawa ...................... 277/595
(Continued)

FOREIGN PATENT DOCUMENTS

CN         1598366 A      3/2005
CN       101529138 A      9/2009
(Continued)

*Primary Examiner* — Kristina Fulton
*Assistant Examiner* — Eugene G Byrd
(74) *Attorney, Agent, or Firm* — Harness, Dickey & Pierce, P.L.C.

(57) ABSTRACT

A seal structure has one metal gasket arranged between a pair of casings. The metal gasket is provided with a planate outer peripheral portion and a bead portion which is formed by rising up from an inner peripheral end portion of the outer peripheral portion, and is arranged so that the bead portion comes into contact with the one casing, and the outer peripheral portion comes into contact with the other casing. The bead portion elastically deforms so as to reduce its height and the outer peripheral portion elastically deforms on the basis of the elastic deformation of the bead portion, when the metal gasket is pinched by the pair of casings, and a leading end of the outer peripheral portion comes into contact with one casing at this time, whereby any gap in which salt water stays is not formed between one casing and the metal gasket.

2 Claims, 5 Drawing Sheets

(52) U.S. Cl.
CPC ......... *F16J 15/0825* (2013.01); *F16J 15/122* (2013.01); *F16J 2015/085* (2013.01); *F16J 2015/0856* (2013.01)

(58) Field of Classification Search
CPC ........... F16J 2015/085; F16J 2015/0862; F16J 15/0887; F02F 11/00
See application file for complete search history.

(56) References Cited

U.S. PATENT DOCUMENTS

| | | | | |
|---|---|---|---|---|
| 5,322,299 | A * | 6/1994 | Terai | 277/596 |
| 5,924,700 | A * | 7/1999 | Kobayashi | 277/595 |
| 6,056,296 | A * | 5/2000 | Ii | 277/595 |
| 6,247,704 | B1 * | 6/2001 | Battistoni | 277/592 |
| 6,422,572 | B1 * | 7/2002 | Ueda | F16J 15/0825 277/591 |
| 7,976,028 | B2 * | 7/2011 | Miyoshi et al. | 277/652 |
| 2002/0127411 | A1 * | 9/2002 | Murakami et al. | 428/423.9 |
| 2003/0230858 | A1 | 12/2003 | Matsuki et al. | |
| 2004/0041352 | A1 * | 3/2004 | Hohe et al. | 277/593 |
| 2004/0239042 | A1 * | 12/2004 | Stecher et al. | 277/592 |
| 2008/0237998 | A1 * | 10/2008 | Chen et al. | 277/595 |
| 2009/0033039 | A1 * | 2/2009 | Anderson et al. | 277/595 |
| 2011/0001295 | A1 * | 1/2011 | Egloff et al. | 277/592 |
| 2011/0254232 | A1 * | 10/2011 | Takeda et al. | 277/591 |

FOREIGN PATENT DOCUMENTS

| | | |
|---|---|---|
| CN | 101910688 A | 12/2010 |
| EP | 0369033 A1 | 5/1990 |
| EP | 1371884 A2 | 12/2003 |
| JP | H05-090042 U | 12/1993 |
| JP | H07-224938 A | 8/1995 |
| JP | 10-331982 A | 12/1998 |
| JP | H11-241769 A | 9/1999 |
| JP | 2001-248496 A | 9/2001 |
| JP | 2003-120813 A | 4/2003 |
| JP | 2004-019668 A | 1/2004 |
| JP | 2004-52956 A | 2/2004 |
| JP | 2008-164156 A | 7/2008 |
| JP | 2009-156382 A | 7/2009 |

* cited by examiner

SEAL STRUCTURE USING METAL GASKET

CROSS-REFERENCE TO RELATED APPLICATIONS

This application is a U.S. National Stage Application of International Application No. PCT/JP2012/060921 filed on Apr. 24, 2012, and published in Japanese as WO 2013/008511 A1 on Jan. 17, 2013. This application claims priority to Japanese Application No. 2011-152543 filed Jul. 11, 2011 and Japanese Application No. 2011-285551 filed Dec. 27, 2011. The disclosures of the above applications are incorporated herein by reference.

BACKGROUND OF THE INVENTION

Field of the Invention

The present invention relates to a seal structure using a metal gasket. The seal structure according to the present invention is used, for example, an automobile-related field, or is used in the other fields.

Description of the Conventional Art

For example, in the metal gasket for the automobile, in preparation for such a condition that the automobile travels in a seaside area, there is a case that a neutral salt spray test is executed as a spec evaluation item. In this case, in the case that a casing in the other end to which the metal gasket is installed is made of an aluminum material (including an aluminum alloy, same as above), salt water is piled up in (attached to) a gap between the metal gasket and the casing, and corrosion (gap corrosion) of the aluminum material due to the salt water (difference in an ion concentration) is generated by repeating a dry condition and a wet condition. The metal gasket achieves a seal function on the basis of a reaction of a portion coming into contact with the casing, however, the seal function is deteriorated in the case that the corrosion portion of the casing passes through a seal line.

The corrosion is generated even in the case that the casing is made of an iron-based material, however, since the aluminum (Al) has a greater ionization tendency than the iron-based material (Fe), the aluminum tends to be corroded.

$$Al^{3+}+3H_2O \rightarrow Al(OH)_3+3H^+$$

SUMMARY OF THE INVENTION

Problem to be Solved by the Invention

The present invention is made by taking the above points into consideration, and an object of the present invention is to provide a seal structure using a metal gasket, which is structured such that a gap in which the salt water stays is not formed between the metal gasket and a casing, whereby the corrosion of the casing is hard to be generated by the staying of the salt water and the seal function is maintained over a long term.

Means for Solving the Problem

In order to achieve the object mentioned above, according to the first aspect of the present invention, there is provided a seal structure including one metal gasket which is arranged between a pair of casings, wherein the metal gasket is provided with a planate outer peripheral portion and a bead portion which is formed by rising up from an inner peripheral end portion of the outer peripheral portion, and is arranged so that the bead portion comes into contact with the one casing, and the outer peripheral portion comes into contact with the other casing, the bead portion elastically deforms so as to reduce its height and the outer peripheral portion elastically deforms on the basis of the elastic deformation of the bead portion, when the metal gasket is pinched by the pair of casings, and a leading end of the outer peripheral portion comes into contact with the one casing at this time, whereby any gap in which salt water stays is not formed between the one casing and the metal gasket.

Further, according to the second aspect of the present invention, there is provided a seal structure including two metal gaskets which are arranged in a state in which the metal gaskets are overlapped between a pair of casings, wherein the metal gaskets are provided with planate outer peripheral portions and bead portions which are formed by rising up from inner peripheral end portions of the outer peripheral portions, and are arranged so that the outer peripheral portions come into contact with each other, the bead portion of the one metal gasket comes into contact with the one casing, and the bead portion of the other metal gasket comes into contact with the other casing, each of the bead portions elastically deforms so as to reduce its height and each of the outer peripheral portions elastically deforms on the basis of the elastic deformation of the bead portion, when these two metal gaskets are pinched by the pair of casings, and a leading end of the outer peripheral portion of the one metal gasket comes into contact with the one casing and the leading end of the outer peripheral portion of the other metal gasket comes into contact with the other casing at this time, whereby any gap in which salt water stays is not formed between the one casing and the one metal gasket, and between the other casing and the other metal gasket.

Further, according to the third aspect of the present invention, there is provided the seal structure described in the first aspect or the second aspect mentioned above, wherein the metal gasket is structured such that in the case that a rubber layer is attached to a surface of a metal base plate, whereby a leading end of the outer peripheral portion comes into contact with the casing, the metal base plate does not come into contact with the casing, but the rubber layer comes into contact with the casing.

Further, according to the fourth aspect of the present invention, there is provided the seal structure described in the third aspect mentioned above, wherein the rubber layer is structured such that in the case a leading end of the rubber layer protrudes out of the leading end of the metal base plate so as to protrude like an eaves shape, whereby the leading end of the outer peripheral portion comes into contact with the casing, the metal base plate is hard to come into contact with the casing.

The seal structure according to the first aspect of the present invention having the structure mentioned above is the structure in which one metal gasket is installed between a pair of casings, and the metal gasket is provided with the planate outer peripheral portion and the bead portion which is formed by rising up from the inner peripheral end portion of the outer peripheral portion, and is arranged so that the bead portion comes into contact with the one casing, and the outer peripheral portion comes into contact with the other casing, in the initial arrangement before being pinched. Further, in the case that the metal gasket is pinched in its thickness direction by a pair of casings, the bead portion elastically deforms so as to reduce its height and the outer peripheral portion elastically deforms on the basis of the elastic deformation of the bead portion, whereby the leading end of the outer peripheral portion comes into contact with the one casing at this time. Therefore, the one casing and the metal gasket are occluded therebetween by the contact, so that since the gap in which the salt water stays is not formed, it is possible to inhibit the corrosion of the casing from being generated by the staying of the salt water even in the case that the one casing is made of the aluminum material.

Further, the seal structure according to the second aspect of the present invention having the structure mentioned above is the structure in which two metal gaskets are installed in a state in which the metal gaskets are overlapped between a pair of casings, the metal gaskets are respectively provided with the planate outer peripheral portions and the bead portions which are formed by rising up from the inner peripheral end portions of the outer peripheral portions, and are arranged so that the outer peripheral portions come into contact with each other, the bead portion of the one metal gasket comes into contact with the one casing at the initial state before being pinched, and the bead portion of the other metal gasket comes into contact with the other casing. Further, each of the bead portions elastically deforms so as to reduce its height and each of the outer peripheral portions elastically deforms on the basis of the elastic deformation of the bead portion, when two metal gaskets are pinched by the pair of casings, and the leading end of the outer peripheral portion of the one metal gasket comes into contact with the one casing and the leading end of the outer peripheral portion of the other metal gasket comes into contact with the other casing at this time. Therefore, the one casing and the one metal gasket are occluded therebetween, and the other casing and the other metal gasket are occluded respectively by the contact, so that since the gap in which the salt water stays is not formed, it is possible to inhibit the corrosion of the casing from being generated by the staying of the salt water even in the case that the one casing and the other casing are made of the aluminum material, respectively.

In the case that the metal gasket is structured such that the rubber layer is attached to the surface of the metal base plate, it is desirable to structure such that in the case that the leading end of the outer peripheral portion of the gasket comes into contact with the casing, the metal base plate does not come into contact with the casing, but the rubber layer comes into contact with the casing. As a result, it is possible to further effectively suppress an electric corrosion of the casing which may be generated in the case that the casing is made of the aluminum material. In the electric corrosion, a circuit (a battery) is formed between the casing and a bolt, and the gasket by the attachment of the salt water to the casing and a potential difference is generated, whereby the casing runs into the corrosion. Accordingly, if the metal base plate does not come into contact with the casing, the circuit is not formed.

Here, since the leading end of the outer peripheral portion of the gasket comes into contact with the casing diagonally with any angle, and the rubber layer tends to collapse due to the reaction force, there is a risk that the metal base plate comes into contact with the casing even in the case that the rubber layer is attached to the surface of the metal base plate. In order to devise a countermeasure, it is preferable that the leading end of the rubber layer is protruded out of the leading end of the metal base plate so as to be protruded like the eaves shape. As a result, since the rubber eaves portion is always interposed between the metal base plate and the casing, it is possible to effectively inhibit the metal base plate from coming into contact with the casing.

Effect of the Invention

The present invention achieves the following effects.

In other words, according to the present invention provided with the structure mentioned above, since the gap in which the salt water stays is not formed between the one casing and the metal gasket, or between the one casing and the one metal gasket and between the other casing and the other metal gasket, respectively, it is possible to inhibit the corrosion of the casing from being generated due to the staying of the salt water. Therefore, it is possible to maintain the seal function by the metal gasket over a long term. Further, it is possible to inhibit the electric corrosion from being generated in the case that the casing is made of the aluminum material, by structuring such that the metal base plate does not come into contact with the casing but the rubber layer comes into contact with the casing, and it is possible to inhibit the metal base plate from coming into contact with the casing, by setting the leading end of the rubber layer as the eaves shape.

DETAILED DESCRIPTION OF PREFERRED EMBODIMENTS

The following embodiments are included in the present invention.

Relevant to First, Third and Fourth Aspects (1) The seal function is prolonged in the case of the aluminum and the iron-based mating face.

(2) The stainless steel, the cold rolled steel sheets, the galvanized steel sheet and the aluminum laminated sheet are used as the gasket base material.

(3) The rubber compound forming the gasket rubber is a synthetic rubber sheet which includes at least one of the nitrile rubber, the styrene butadiene rubber, the fluorine-contained rubber, the acrylic rubber and the silicone rubber.

(4) In the case of the aluminum casing and the iron-based flange, for the purpose of reducing the corrosion of the aluminum casing by the salt water, further delaying the loss of the gasket seal function due to the progress of the corrosion, the bead (direction) is set so that the end portion of the gasket is pressed to the aluminum casing side.

Figure 1:
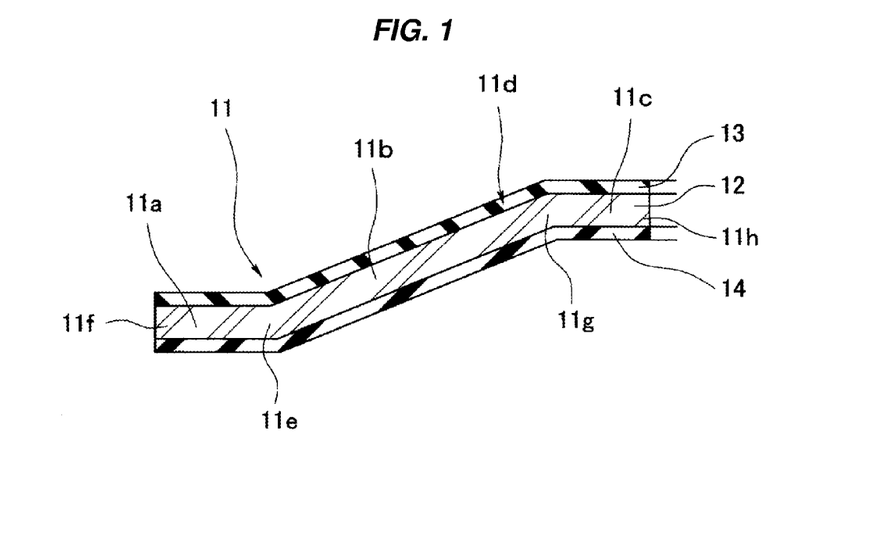
FIG. 1 is a cross sectional view of a substantial part of a metal gasket which is used in a seal structure according to a first embodiment of the present invention.
Figure 2:
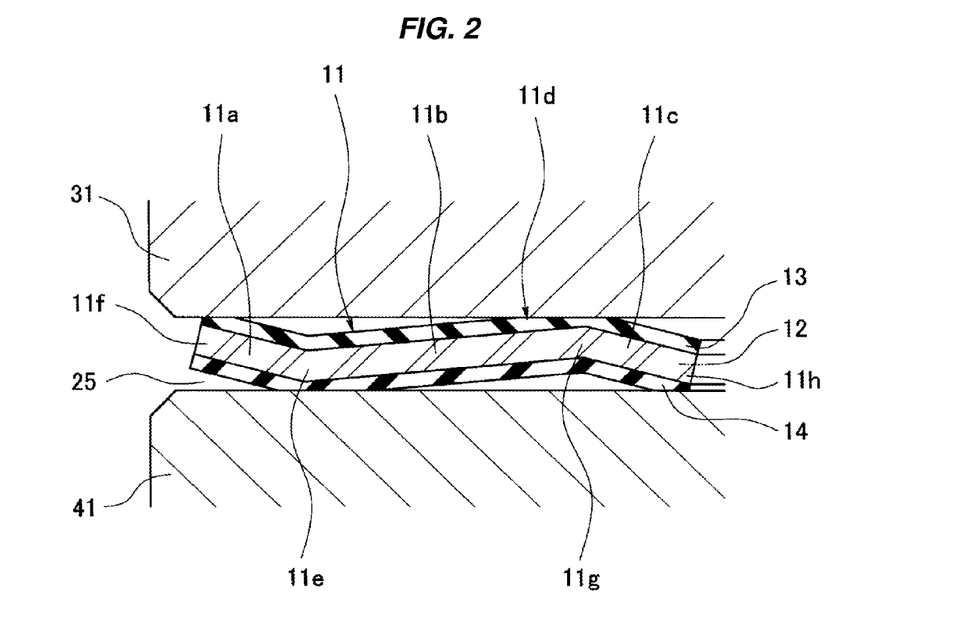
FIG. 2 is a cross sectional view of a substantial part and shows a fastened state of the seal structure.

(5) The material which is mainly used as the casing or the flange is the aluminum or the iron-based material, and Al has the ionizing tendency which is greater than Fe, and tends to be corroded under the salt water spray environment. In the case of the mating face of the aluminum and the iron-based material, it is possible to reduce the aluminum side corrosion and it is possible to delay the gasket seal function loss, by setting the direction of the bead as shown in FIGS. 1 and 2 so as to prevent the salt water from being piled in the aluminum side which tends to be corroded, and setting the punching burr as shown in FIG. 3. Further, it is possible to devise a countermeasure at a lower cost than the case that two gaskets are laminated.

Relevant to Second, Third and Fourth Aspects.

(6) In the laminated metal gasket raw material in which the rubber layer is provided in both surfaces of the base material metal via the adhesive agent layer, the seal function is prolonged by laminating two gaskets, reducing the gap between the gasket and the outer peripheral portion of the casing by utilizing the flip-up of the end portion, and reducing the attaching and piling amount of the salt water to the gap.

(7) The stainless steel, the cold rolled steel sheets, the galvanized steel sheet and the aluminum laminated sheet are used as the gasket base material.

(8) The rubber compound forming the gasket rubber is a synthetic rubber sheet which includes at least one of the nitrile rubber, the styrene butadiene rubber, the fluorine-contained rubber, the acrylic rubber and the silicone rubber.

(9) The gap between the gasket and the outer peripheral portion of the casing is reduced by laminating two gaskets and utilizing the flip-up of the gasket end portion at the compressing time. The progress of the gap corrosion is suppressed by generating the surface pressure in the edge portion of the gasket end portion, doing away with the gap and making the salt water hard to be piled up.

(10) Further, the steel sheet is prevented from being exposed in the end portion of the gasket, by changing the punching direction of the gasket, and the steel sheet is prevented from coming into contact with the housing. The steel sheet is prevented from coming into contact with the casing by setting the punching direction so that the rubber jumps out to the aluminum casing side. The end portion of the gasket is covered with the rubber by changing the punching direction of the gasket, thereby doing away with the edge portion.

(11) According to the structures (6) to (10) mentioned above, it is possible to reduce the amount of the salt water piling up in the aluminum casing (the gap between the aluminum casing and the outer peripheral portion of the gasket). Since the amount of the piling-up salt water is reduced, it is possible to hold down the speed at which the corrosion of the aluminum casing makes progress by the salt water, thereby causing the prolongation of the seal function. Further, it is possible to do away with the edge portion and prevent the corrosion, by preventing the contact between the steel sheet and the aluminum casing in the end portion of the gasket.

EMBODIMENTS

Next, a description will be given of embodiments according to the present invention with reference to the accompanying drawings.

First Embodiment (Relevant to First, Third and Fourth Aspects)

FIG. 1 shows a cross section of a substantial part of a metal gasket 11 which is used in a seal structure according to a first embodiment of the present invention. In the case that the metal gasket 11 is arranged between a pair of casings (housings or flanges) 31 and 41 and is pinched (fastened by bolts) in a gasket thickness direction (a vertical direction in the drawing), the metal gasket 11 comes to a fastened state shown in FIG. 2. A left side of each of the drawings is an outer side (an outer peripheral side) of the gasket 11, that is, a sealed fluid side such as salt water, and a right side is an inner side (an inner peripheral side) of the gasket 11. Further, as shown in FIG. 2, a pair of casings 31 and 41 are constructed by a combination of one casing 31 in an upper side of the drawing and the other casing 41 in a lower side of the drawing. Among them, one casing 31 in the upper side of the drawing is made of an aluminum material, and is a subject to be suppressed corrosion according to the present embodiment. On the other hand, the other casing 41 in the lower side of the drawing is made of an iron-based material, and is not a subject to be suppressed corrosion according to the present embodiment. In the present embodiment, one metal gasket 11 is installed between a pair of casings 31 and 41.

As shown in FIG. 1, the metal gasket 11 is integrally provided with a planate outer peripheral portion 11a, and a bead portion 11d which is formed so as to rise up from an inner peripheral end portion of the outer peripheral portion 11a toward one side (an upward direction in the drawing) in a gasket thickness direction.

In other words, describing further in detail, the metal gasket 11 is provided with the planate outer peripheral portion 11a, an inclined surface portion 11b is integrally formed from the inner peripheral end portion of the outer peripheral portion 11a toward a diagonally upper side, and a planate inner peripheral portion 11c is integrally formed in an inner peripheral end portion of the inclined surface portion 11b. The bead portion 11d having a half bead shape and constructed by the inclined surface portion 11b and the inner peripheral portion 11c is set while having the planate outer peripheral portion 11a as a gasket base plate portion.

Further, the metal gasket 11 is provided with a metal base plate (a steel sheet layer) 12, and rubber layers (surface rubber layers) 13 and 14 are attached over a whole surface to both surfaces in a thickness direction of the metal base plate 12. Therefore, the metal gasket 11 is formed as a laminated type metal gasket (a rubber coating metal gasket) which is constructed by a combination of the metal base plate 12 and the rubber layers 13 and 14.

In the metal gasket 11 having the structure mentioned above, in an initial state before the metal gasket is pinched by a pair of casings 31 and 41, an upper surface of the planate inner peripheral portion 11c constructing a part of the bead portion 11d comes into contact (surface contact) with a lower surface of the one casing 31 in the upper side and a lower surface of the planate outer peripheral portion 11a comes into contact (surface contact) with an upper surface of the other casing 41 in the lower side. In this state, an initial gap is formed between the upper surfaces of the outer peripheral portion 11a and the inclined surface portion 11b and the lower surface of the one casing 31 in the upper side. However, in the case that the gasket is thereafter pinched in the gasket thickness direction by a pair of casings 31 and 41, the gasket comes to a fastened state shown in FIG. 2. In other words, the bead portion 11d formed as the half bead shape is elastically deformed so as to reduce its height, and the planate outer peripheral portion 11a is elastically deformed diagonally on the basis of the elastic deformation of the bead portion. At this time, the outer peripheral portion 11a jumps up its leading end 11f upward while using a lower surface of a corner portion 11e between the outer peripheral portion 11a and the bead portion 11d as a supporting point of a lever action, and the leading end 11f comes into contact with the lower surface of the one casing 31 in the upper side in its upper end (the upper face rubber layer 13).

Therefore, the initial gap is occluded by the contact of the leading end 11f of the outer peripheral portion 11a with the lower surface of the one casing 31 in the upper side. As a result, since the gap in which the sealed fluid such as the salt water stays is not formed between the one casing 31 and the metal gasket 11, it is possible to inhibit the corrosion from being generated in the one casing 31 made of the aluminum material due to the staying of the salt water.

A wedge-like gap 25 which is open like a V-shaped form in a cross section is formed between the other casing 41 in the lower side and the outer peripheral portion 11a of the metal gasket 11, however, even if the salt water stays here, the other casing 41 is made of the iron-based material and is hard to be corroded.

Further, in the seal structure having the structure mentioned above, in the case that the leading end 11f of the outer peripheral portion 11a in the metal gasket 11 comes into contact with the lower surface of the one casing 31 in the upper side, the metal base plate 12 does not come into contact with the casing 31, but only the upper surface rubber layer 13 comes into contact with the casing 31. Accordingly, in this regard, it is possible to inhibit the electric corrosion from being generated even in the case that the one casing 31 is made of the aluminum material.

Since the metal gasket 11 is structured by integrally forming the bead portion 11d which is constructed by the inclined surface portion 11b and the inner peripheral portion 11c and is formed as the half bead shape, in the inner side of the planate outer peripheral portion 11a as mentioned above, the upper surface of the corner portion 11g of the bead portion 11d and the leading end 11f of the outer peripheral portion 11a respectively come into close contact with the lower surface of the one casing 31 in the upper side by the rubber layer 13, and the lower surface of the corner portion 11e between the outer peripheral portion 11a and the bead portion 11d and the leading end 11h of the inner peripheral portion 11c respectively come into contact with the upper surface of the other casing 41 in the lower side by the rubber layer 14, as shown in FIG. 2 by fastening. Therefore, two seal lines are set respectively in the upper and lower surfaces of the metal gasket 11.

In the first embodiment, the bead portion 11d provided in the metal gasket 11 is formed as the half bead shape which is constructed by the inclined surface portion 11b and the inner peripheral portion 11c, however, the shape of the bead portion 11d is not particularly limited as long as the contact of the leading end 11f of the outer peripheral portion 11a with the one casing 31 is secured by the deformation at the fastening time, and the shape may be, for example, a circular arc shape in a cross section or a trapezoidal full bead shape in a cross section.

Figure 3A:
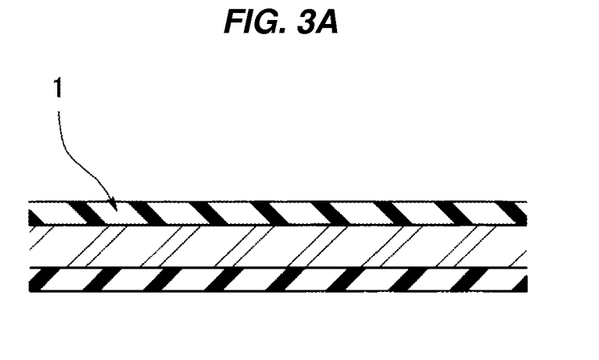
FIG. 3 is an explanatory view showing a manufacturing step of the metal gasket and a contact state with a casing.
Figure 3B:
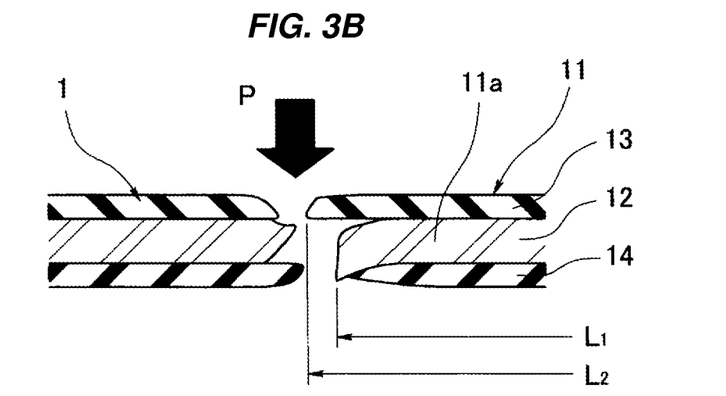
Figure 3C:
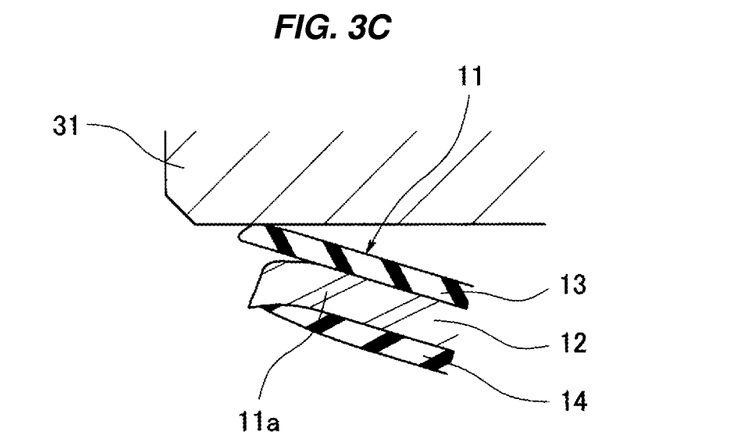

Further, in the case of manufacturing the metal gasket 11, the gasket raw material 1 is punched so that the metal gasket 11 has a predetermined plane shape, however, in the case that a length L2 of the rubber layer 13 in one side coming into contact with the casing 31 is set to be longer than a length L1 of the metal base plate 12 (the plane shape of the rubber layer 13 in the one side coming into contact with the casing 31 is set to be size larger than the plane shape of the metal base plate 12) as shown from FIG. 3A to FIG. 3B at the punching time, the leading end of the rubber layer 13 protrudes more than the leading end of the metal base plate 12, and the leading end of the rubber layer 13 covers like the eaves the leading end of the metal base plate 12, as show in FIG. 3C. Therefore, the metal base plate 12 is hard to come into contact with the casing 31. Accordingly, it is possible to further effectively inhibit the electric corrosion from being generated. In FIG. 3B, a direction for punching the raw material 1 is shown by an arrow P.

Second Embodiment (Relevant to Second, Third and Fourth Aspects)

Figure 4:
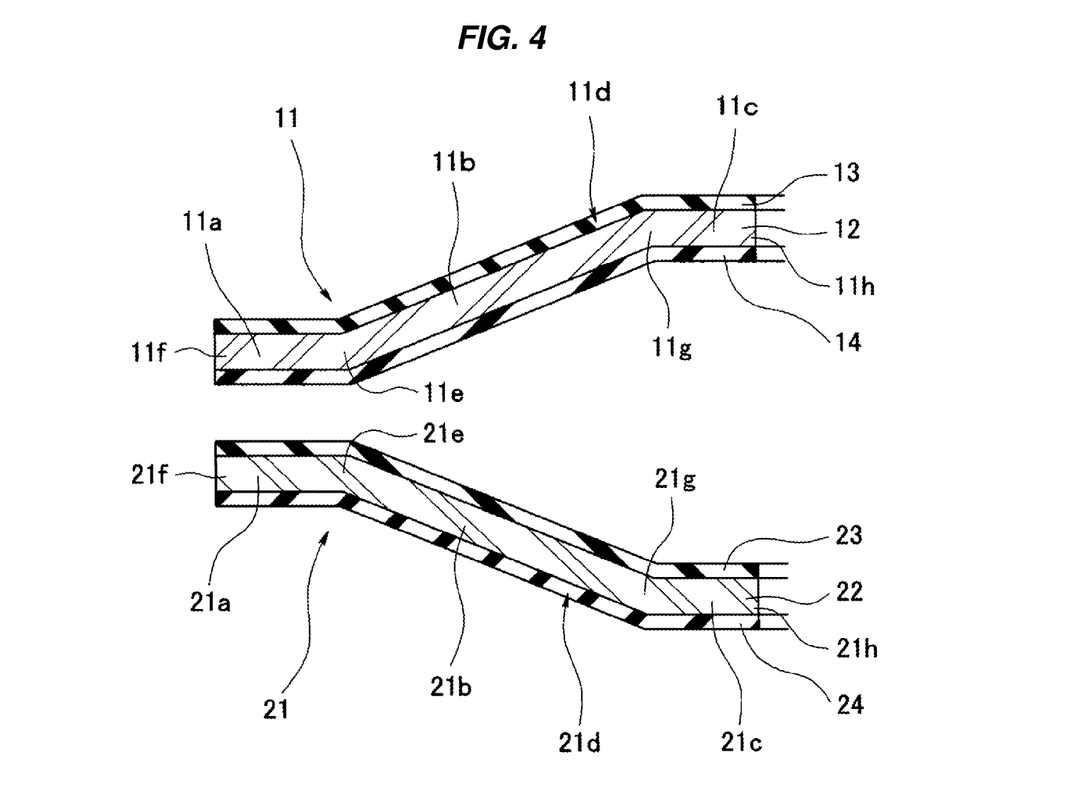
FIG. 4 is a cross sectional view of a substantial part of a metal gasket which is used in a seal structure according to a second embodiment of the present invention.
Figure 5:
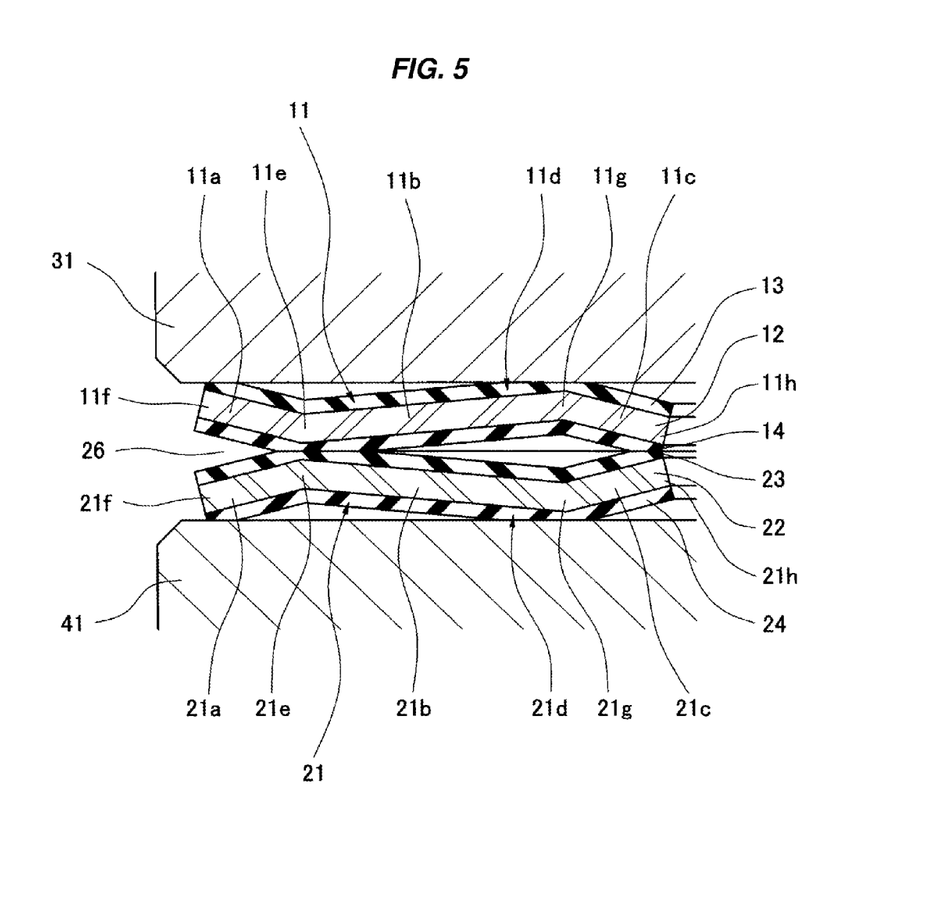
FIG. 5 is a cross sectional view of a substantial part and shows a fastened state of the seal structure.

FIG. 4 shows a cross section of a substantial part of metal gaskets 11 and 21 which are used in a seal structure according to a second embodiment of the present invention. In the case that the metal gaskets 11 and 21 are arranged between a pair of casings (housings or flanges) 31 and 41 in an overlapping state and are pinched (fastened by bolts) in a gasket thickness direction (a vertical direction in the drawing), the metal gaskets 11 and 21 come to a fastened state shown in FIG. 5. A left side of each of the drawings is an outer side (an outer peripheral side) of the gaskets 11 and 21, that is, a sealed fluid side such as salt water, and a right side is an inner side (an inner peripheral side) of the gaskets 11 and 21. Further, as shown in FIG. 5, a pair of casings 31 and 41 are constructed by a combination of one casing 31 in an upper side of the drawing and the other casing 41 in a lower side of the drawing, and both the casings 31 and 41 are made of an aluminum material. Therefore, in the present embodiment, both the casings 31 and 41 are targeted at the suppression of corrosion. In the present embodiment, two metal gaskets 11 and 21 are installed between a pair of casings 31 and 41.

As shown in FIG. 4, the metal gaskets 11 and 21 are constructed by a combination of the one metal gasket 11 in the upper side of the drawing, and the other metal gasket 21 in the lower side of the drawing, and the respective metal gaskets 11 and 21 are integrally provided with planate outer peripheral portions 11a and 21a which are lapped over each other at the installing time, and bead portions 11d and 21d which are formed so as to rise up from inner peripheral end portions of the outer peripheral portions 11a and 21a in a direction of being away from each other.

In other words, describing further in detail, the one metal gasket 11 in the upper side of the drawing is provided with the planate outer peripheral portion 11a, an inclined surface portion 11b is integrally formed from the inner peripheral end portion of the outer peripheral portion 11a toward a diagonally upper side, and a planate inner peripheral portion 11c is integrally formed in an inner peripheral end portion of the inclined surface portion 11b. Therefore, the bead portion 11d having a half bead shape and constructed by the inclined surface portion 11b and the inner peripheral portion 11c is set while having the planate outer peripheral portion 11a as a gasket base plate portion.

On the other hand, the other metal gasket 21 in the lower side of the drawing is provided with the planate outer peripheral portion 21a in the same manner, an inclined surface portion 21b is integrally formed from the inner peripheral end portion of the outer peripheral portion 21 toward a diagonally lower side, and a planate inner peripheral portion 21c is integrally formed in an inner peripheral end portion of the inclined surface portion 21b. Therefore, the bead portion 21d having a half bead shape and constructed by the inclined surface portion 21b and the inner peripheral portion 21c is set while having the planate outer peripheral portion 21a as a gasket base plate portion.

Both the metal gaskets 11 and 21 are formed as vertically symmetrical shapes with each other, formed as vertically symmetrical shapes in at least an illustrated portion, or are arranged in a vertically symmetrical manner.

Further, both the metal gaskets 11 and 21 are provided with metal base plates (steel sheet layers) 12 and 22, and are structured such that rubber layers (surface rubber layers) 13, 14 23 and 24 are attached over a whole surface to both surfaces in a thickness direction of the metal base plates 12 and 22. Therefore, both the metal gaskets 11 and 21 are formed as laminated type metal gaskets (rubber coating metal gaskets) which are constructed by the metal base plates 12 and 22 and the rubber layers 13, 14, 23 and 24.

In both the metal gaskets 11 and 21 having the structures mentioned above, in an initial state before the metal gaskets are pinched by a pair of casings 31 and 41, the lower surface of the outer peripheral portion 11a in the one metal gasket 11 in the upper side and the upper surface of the outer peripheral portion 21a in the other metal gasket 21 in the lower side come into contact (surface contact) with each other, an upper surface of the planate inner peripheral portion 11c constructing a part of the bead portion 11d in the one metal gasket 11 in the upper side comes into contact (surface contact) with the lower surface of the one casing 31 in the upper side, and a lower surface of the planate inner peripheral portion 21c constructing a part of the bead portion 21d in the other metal gasket 21 in the lower side comes into contact (surface contact) with the upper surface of the other casing 41 in the lower side. In this state, an initial gap is formed between the upper surfaces of the outer peripheral portion 11a and the inclined surface portion 11b in the one metal gasket 11 in the upper side, and the lower surface of the one casing 31 in the upper side, and between the lower surfaces of the outer peripheral portion 21a and the inclined surface portion 21b in the other metal gasket 21 in the lower side and the upper surface of the other casing 41 in the lower side, respectively. However, in the case that the gaskets are thereafter pinched in the gasket thickness direction by a pair of casings 31 and 41, the gaskets comes to their fastened states shown in FIG. 5. In other words, the bead portions 11d, 21d formed as the half bead shape are elastically deformed so as to reduce their heights, and the planate outer peripheral portions 11a and 21a are elastically deformed diagonally on the basis of the elastic deformation of the bead portions. At this time, the outer peripheral portion 11a in the one metal gasket 11 in the upper side jumps up its leading end 11f upward while using a lower surface of a corner portion 11e between the outer peripheral portion 11a and the bead portion 11d as a supporting point of a lever action, and the leading end 11f comes into contact with the lower surface of the one casing 31 in the upper side in its upper end (the upper face rubber layer 13).

Therefore, the initial gap is occluded by the contact of the leading end 11f of the outer peripheral portion 11a with the lower surface of the one casing 31 in the upper side. As a result, since the gap in which the sealed fluid such as the salt water stays is not formed between the one casing 31 and the one metal gasket 11, it is possible to inhibit the corrosion from being generated in the one casing 31 made of the aluminum material due to the staying of the salt water.

Further, in the same manner, the outer peripheral portion 21a in the other metal gasket 21 in the lower side jumps up its leading end 21f downward while using an upper surface of a corner portion 21e between the outer peripheral portion 21a and the bead portion 21d as a supporting point of a lever action, and the leading end 21f comes into contact with the upper surface of the other casing 41 in the lower side in its lower end (the lower face rubber layer 24).

Therefore, the initial gap is occluded by the contact of the leading end 21f of the outer peripheral portion 21a with the upper surface of the other casing 41 in the lower side. As a result, since the gap in which the sealed fluid such as the salt water stays is not formed between the other casing 41 and the other metal gasket 21, it is possible to inhibit the corrosion from being generated in the other casing 41 made of the aluminum material due to the staying of the salt water.

A wedge-like gap 26 which is open like a V-shaped form in a cross section is formed between the outer peripheral portions 11a and 21a of both the metal gaskets 11 and 21, however, since the salt water does not come into contact with the casings 31 and 41 even if the salt water stays here, any corrosion is not generated in the casings 31 and 41.

Further, in the seal structure having the structure mentioned above, in the case that the leading end 11f of the outer peripheral portion 11a in the one metal gasket 11 in the upper side comes into contact with the lower surface of the one casing 31 in the upper side, the metal base plate 12 does not come into contact with the casing 31, but only the upper surface rubber layer 13 comes into contact with the casing 31, and even in the case that the leading end 21f of the outer peripheral portion 21a in the other metal gasket 21 in the lower side comes into contact with the upper surface of the other casing 41 in the lower side, the metal base plate 22 does not come into contact with the casing 41, but only the lower surface rubber layer 24 comes into contact with the casing 41. Accordingly, in this regard, it is possible to inhibit the electric corrosion from being generated even in the case that each of the casings 31 and 41 is made of the aluminum material.

Since the one metal gasket 11 in the upper side is structured by integrally forming the bead portion 11d which is constructed by the inclined surface portion 11b and the inner peripheral portion 11c and is formed as the half bead shape, in the inner side of the planate outer peripheral portion 11a as mentioned above, the upper surface of the corner portion 11g of the bead portion 11d and the leading end 11f of the outer peripheral portion 11a respectively come into close contact with the lower surface of the one casing 31 in the upper side, by the rubber layer 13, as shown in FIG. 5 by fastening. Therefore, two seal lines are set here.

Further, in the same manner, since the other metal gasket 21 in the lower side is structured by integrally forming the bead portion 21d which is constructed by the inclined surface portion 21b and the inner peripheral portion 21c and is formed as the half bead shape, in the inner side of the planate outer peripheral portion 21a, the lower surface of the corner portion 21g of the bead portion 21d and the leading end 21f of the outer peripheral portion 21a respectively come into close contact with the upper surface of the other casing 41 in the lower side, by the rubber layer 24, as shown in FIG. 5 by fastening. Therefore, two seal lines are set here.

Further, between the metal gaskets 11 and 21, since the corner portions 11e and 21e between the outer peripheral portions 11a and 21a and the bead portions 11d and 21d, and the leading ends 11h and 21h of the inner peripheral portions 11c and 21c come into close contact with each other, two seal lines are also set here.

In the second embodiment, the bead portions 11d and 21d provided in both the metal gaskets 11 and 21 are respectively formed as the half bead shapes which are constructed by the inclined surface portions 11b and 21b and the inner peripheral portions 11c and 21c, however, the shape of the bead portions 11d and 21d are not particularly limited as long as the contact of the leading ends 11f and 21f of the outer peripheral portions 11a and 21a with the one casing 31 or the other casing 41 is secured by the deformation at the fastening time, and the shape may be, for example, a circular arc shape in a cross section or a trapezoidal full bead shape in a cross section.

Figure 6A:
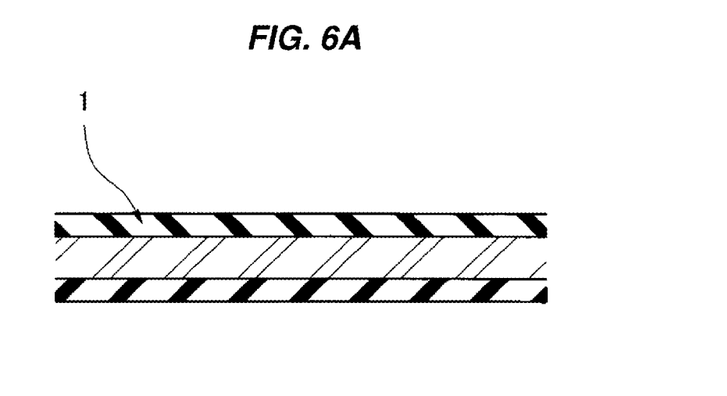
FIG. 6 is an explanatory view showing a manufacturing step of the metal gasket and a contact state with a casing.
Figure 6B:
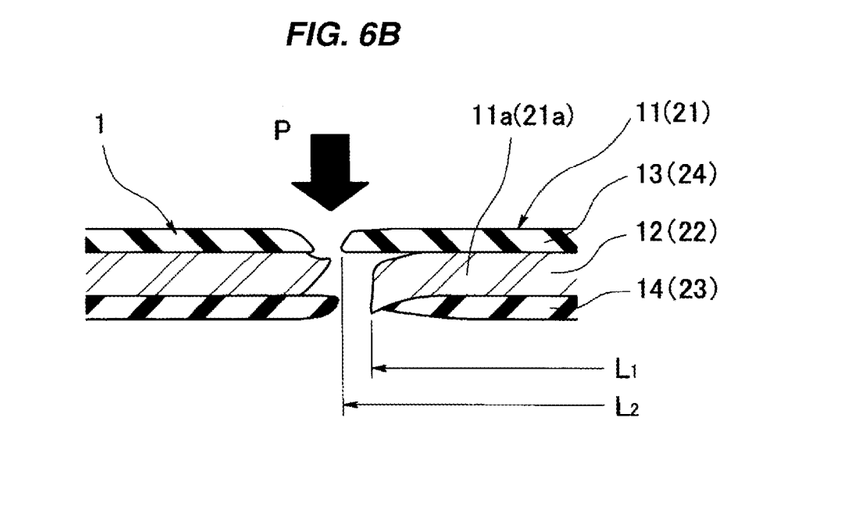
Figure 6C:
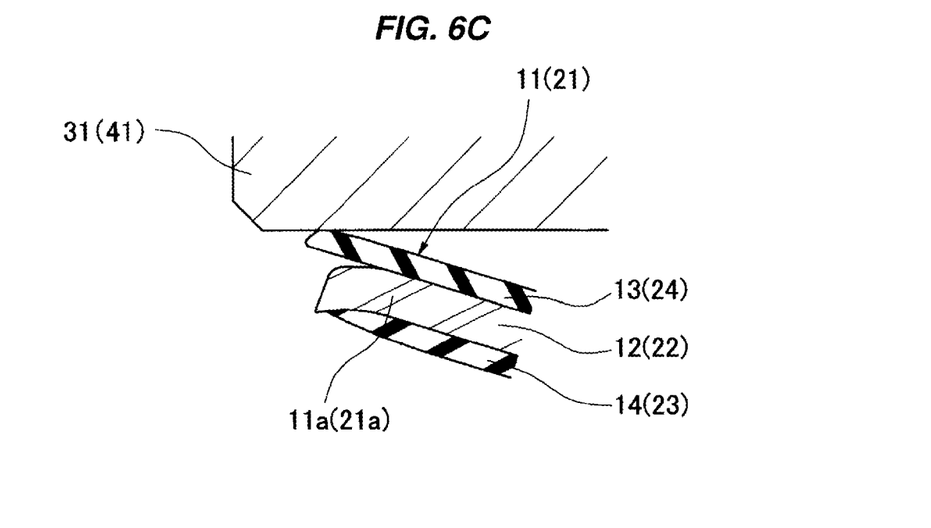

Further, in the case of manufacturing both the metal gaskets 11 and 21, the gasket raw material 1 is punched so that the metal gaskets 11 and 21 have a predetermined plane shape, however, in the case that a length L2 of the rubber layers 13 and 24 in one side coming into contact with the casings 31 and 41 is set to be longer than a length L1 of the metal base plates 12 and 22 (the plane shape of the rubber layers 13 and 24 in the one side coming into contact with the casings 31 and 41 is set to be size larger than the plane shape of the metal base plates 12 and 22) as shown from FIG. 6A to FIG. 6B at the punching time, the leading ends of the rubber layers 13 and 24 protrude more than the leading ends of the metal base plates 12 and 22, and the leading ends of the rubber layers 13 and 24 cover like the eaves the leading ends of the metal base plates 12 and 22, as shown in FIG. 6C. Therefore, the metal base plates 12 and 22 are hard to come into contact with the casings 31 and 41. Accordingly, it is possible to further effectively inhibit the electric corrosion from being generated. In FIG. 6B, a direction for punching the raw material 1 is shown by an arrow P.

What is claimed is:

1. A seal structure using a metal gasket, the seal structure comprising:
   one metal gasket which is arranged between a pair of casings, said metal gasket being provided with:
   a planate outer peripheral portion; and
   a bead portion which rises up from an inner peripheral end portion of said planate outer peripheral portion, and is arranged so that said bead portion comes into contact with a first casing of said pair of casings, and said planate outer peripheral portion comes into contact with a second casing of said pair of casings,
   wherein, when said one metal gasket is pinched by said pair of casings:
   said bead portion elastically deforms so as to reduce its height and said planate outer peripheral portion elastically deforms on the basis of the elastic deformation of the bead portion, and
   a leading end of said planate outer peripheral portion comes into contact with said first casing so that no gap is formed between said first casing and said metal gasket,
   wherein said metal gasket is structured by first and second rubber layers respectively attached to opposing surfaces of a metal base plate, said metal base plate has an exposed peripheral edge that is free of said first rubber layer, and when said leading end of said planate outer peripheral portion comes into contact with the first casing, said first rubber layer comes into contact with the first casing but said metal base plate does not come into contact with the first casing, and
   wherein said first rubber layer is structured such that a leading end of said first rubber layer extends radially outwardly relative to the exposed peripheral edge of the leading end of said metal base plate so as to protrude in an eaves shape terminating at a free distal edge,
   wherein an end-face of said leading end of said first rubber layer is slanted,
   wherein said leading end of said metal base plate is bent to angle away from said first casing, and
   wherein said second rubber layer tapers to a knife edge along said leading end of said metal base plate.

2. A seal structure using a metal gasket, the seal structure comprising:
   two metal gaskets which are arranged so as to be overlapped between a pair of casings, said metal gaskets being provided with:
   planate outer peripheral portions; and
   bead portions which rise up from inner peripheral end portions of said planate outer peripheral portions, and are arranged so that:
   said outer peripheral portions come into contact with each other,
   the bead portion of a first metal gasket of said two metal gaskets comes into contact with a first casing of said pair of casings, and
   the bead portion of a second metal gasket of said two metal gaskets comes into contact with a second casing of said pair of casings,
   wherein, when said two metal gaskets are pinched by said pair of casings:
   each of said bead portions elastically deforms so as to reduce its height and each of said planate outer peripheral portions elastically deforms on the basis of the elastic deformation of the bead portion, and
   a leading end of the planate outer peripheral portion of said first metal gasket comes into contact with said first casing and a leading end of the planate outer peripheral portion of said second metal gasket comes into contact with said second casing so that no gap is formed between said first casing and said first metal gasket, and between said second casing and said second metal gasket,
   wherein said first metal gasket is structured by first and second rubber layers respectively attached to opposing surfaces of a first metal base plate, said first metal base plate has an exposed peripheral edge that is free of said first rubber layer, and when said leading end of said planate outer peripheral portion of said first metal gasket comes into contact with the first casing, said first rubber layer comes into contact with the first casing but said first metal base plate does not come into contact with the first casing;
   wherein said first rubber layer is structured such that a leading end of said first rubber layer extends radially outwardly relative to the exposed peripheral edge of the leading end of said first metal base plate so as to protrude in an eaves shape terminating at a free distal edge;
   wherein an end-face of said leading end of said first rubber layer is slanted;
   wherein said leading end of said first metal base plate is bent to angle away from said first casing;
   wherein said second rubber layer tapers to a knife edge along said leading end of said first metal base plate;
   wherein said second metal gasket is structured by third and fourth rubber layers respectively attached to opposing surfaces of a second metal base plate, said second metal base plate has an exposed peripheral edge that is free of said fourth rubber layer, and when said leading end of said planate outer peripheral portion of said second metal gasket comes into contact with the second casing, said fourth rubber layer comes into contact with the second casing but said second metal base plate does not come into contact with the second casing,
   wherein said fourth rubber layer is structured such that a leading end of said fourth rubber layer extends radially outwardly relative to the leading end of said second metal base plate so as to protrude in an eaves shape,
   wherein an end-face of said leading end of said fourth rubber layer is slanted,
   wherein said leading end of said second metal base plate is bent to angle away from said second casing, and wherein said third rubber layer tapers to a knife edge along said leading end of said second metal base plate.

* * * * *